United States Patent [19]

Bell

[11] 3,708,070

[45] Jan. 2, 1973

[54] OIL SKIMMER

[75] Inventor: Edwin A. Bell, Lake Charles, La. 70601

[73] Assignee: Cities Service Oil Co.

[22] Filed: Oct. 2, 1970

[21] Appl. No.: 77,596

[52] U.S. Cl. ............................210/242, 210/DIG. 21
[51] Int. Cl. .............................................C02b 9/02
[58] Field of Search.........210/242, 523, 83, DIG. 21, 210/169

[56] References Cited

UNITED STATES PATENTS

| | | | |
|---|---|---|---|
| 3,087,335 | 4/1963 | Cavenah | 210/169 UX |
| 3,523,611 | 8/1970 | Fitzgerald | 210/DIG. 21 |
| 3,348,690 | 10/1967 | Cornelissen | 210/242 |
| 61,880 | 2/1967 | Serrell | 210/242 |
| 3,237,774 | 3/1966 | Schuback | 210/DIG. 21 |
| 1,591,024 | 7/1926 | Dodge | 210/DIG. 21 |
| 3,067,879 | 12/1962 | Baker | 210/169 |
| 3,630,376 | 12/1971 | Price | 210/242 |

FOREIGN PATENTS OR APPLICATIONS 947,026   1/1964   Great Britain.......................210/242

OTHER PUBLICATIONS

Ocean Industry, June 1970, Vol. 5, No. 6. Gulf Publishing Co., 3301 Allen Parkway, Houston, Texas, p. 54

Primary Examiner—Reuben Friedman
Assistant Examiner—T. A. Granger
Attorney—J. Richard Geaman

[57] ABSTRACT

In order to recover surface oil from a body of water a floating oil skimmer barge is provided with a series of compartments, beginning at the prow of the barge, inflow to each compartment being effected over a respective floating baffle pivotally mounted at its bottom edge to swing into its compartment to a depth determined by the pressure differential across the baffle. Position of the baffle is controlled by pumping water at controlled rates from the bottom of the downstream end of each compartment to thereby cause an effective surface flow between compartments. Surface oil builds up in depth at the downstream end of the last compartment and is collected, substantially free of water, in a recovery chamber which is also provided with a floating baffle and from which oil is pumped at controllable rates.

6 Claims, 5 Drawing Figures

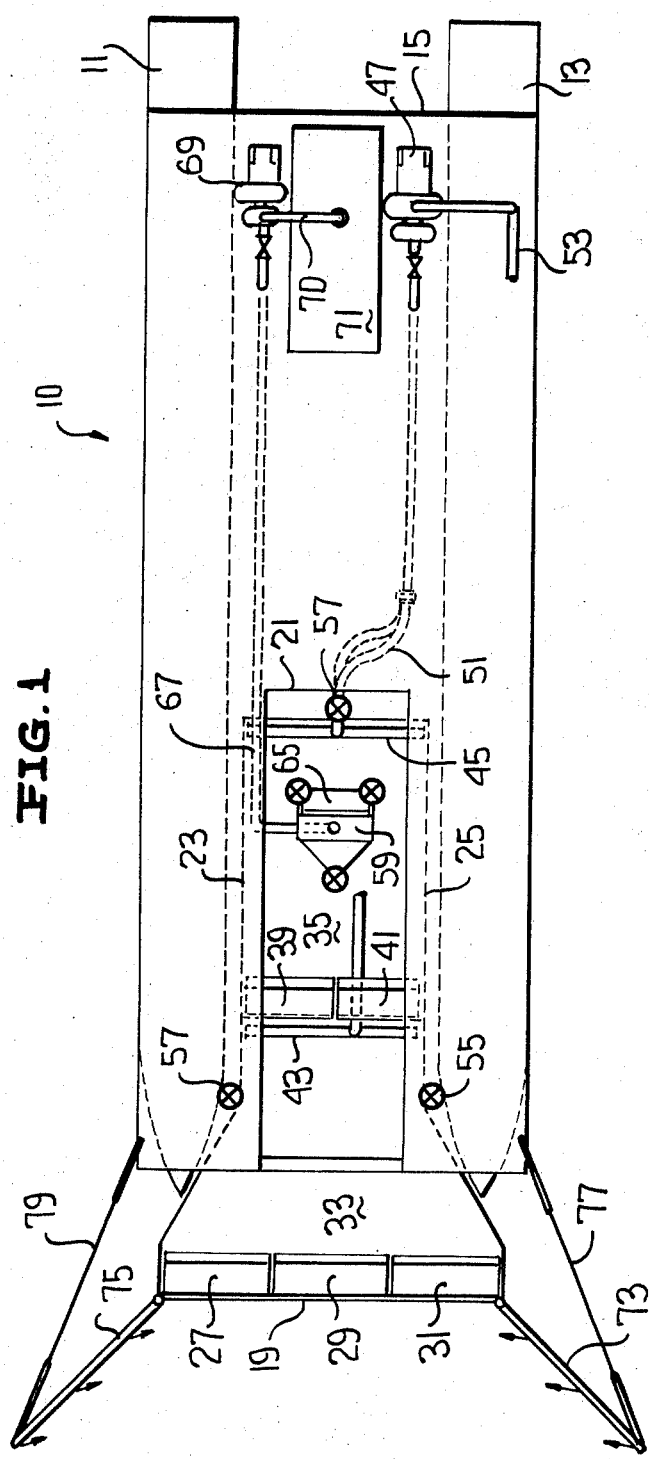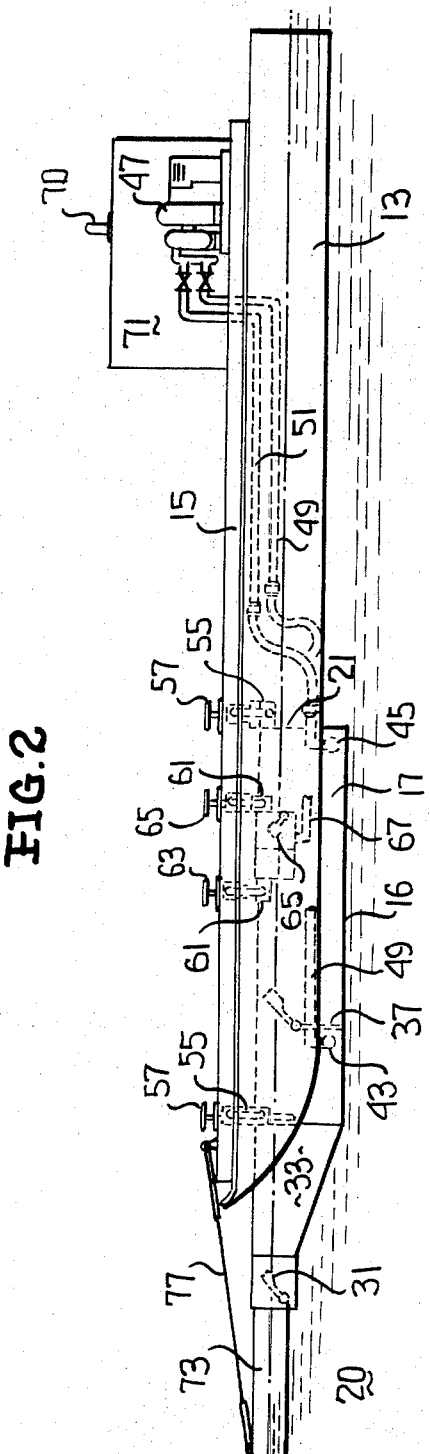
INVENTOR
EDWIN A. BELL
BY Hurvitz & Rose
ATTORNEYS

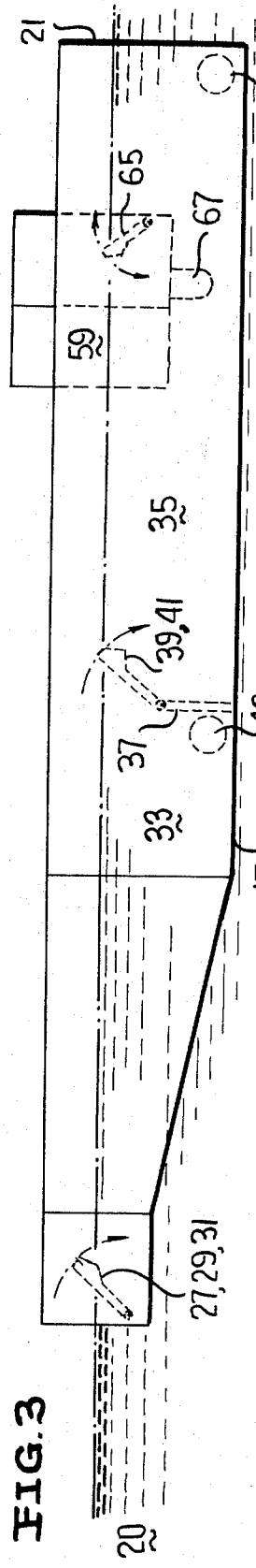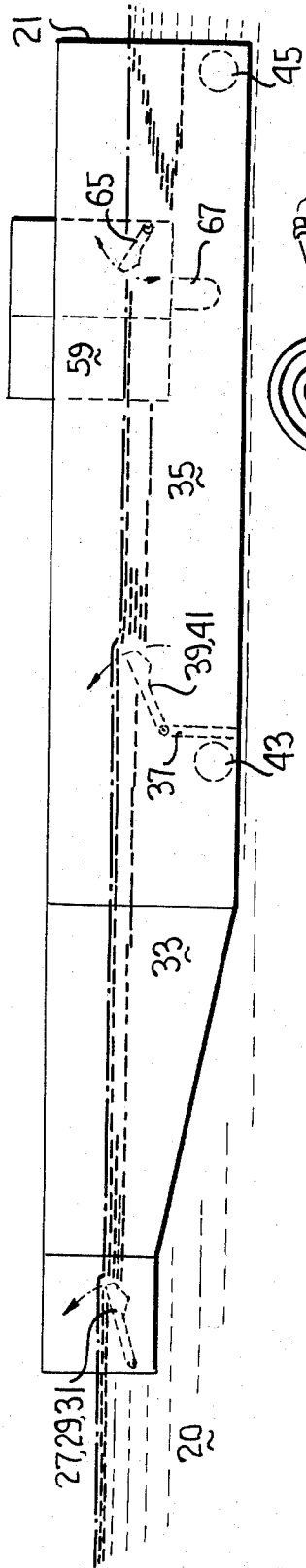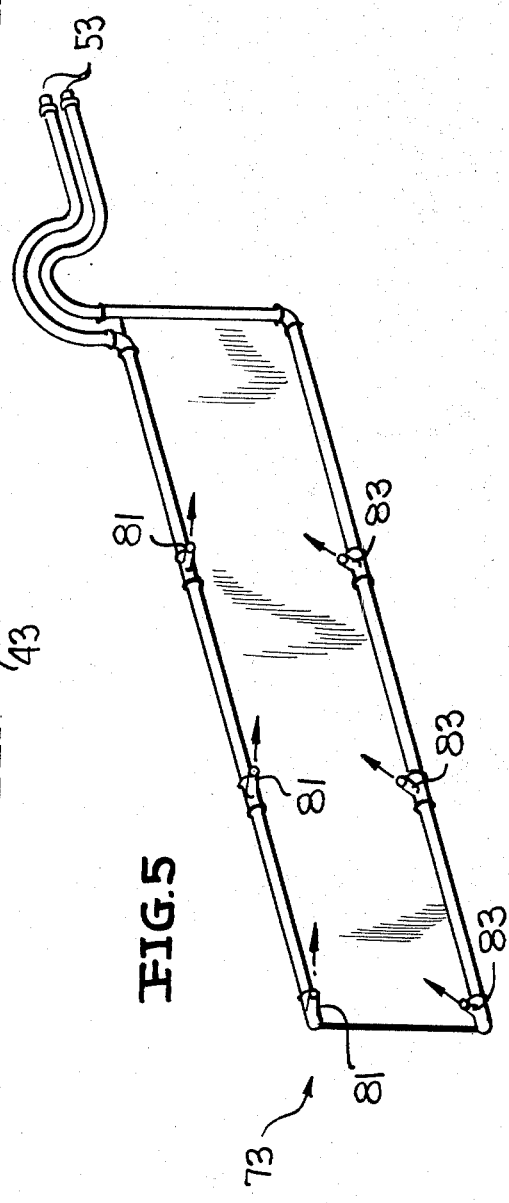

OIL SKIMMER

BACKGROUND OF THE INVENTION

The present invention relates to a method and apparatus for skimming a relatively light liquid, such as oil, from the surface of a body of second liquid, such as water.

Accidental spillage of oil onto the surface of a body of water often has catastrophic results with relation to pollution of the water, fouling of nearby beaches, and destruction of animal and vegetable marine life. Such accidental spillage is often brought dramatically to public attention when resulting from collisions from vessels and leakages from off shore drilling rigs. Less dramatic, though cumulatively as catastrophic, is the spillage resulting from slush-pit leakage, pipe line to rupture, and frequent discharge of oil-laden water from ships in busy harbors or along heavily used sea lanes. Prior art approaches to separation of oil and similar liquids from the surface of a body of water have required complex and expensive machinery to effect efficient separation. In some cases it is desirable to utilize the separated oil; however, prior art approaches employing relatively simple machinery have resulted in a collected mixture having too high a water content to be commercially useful. It is therefore an object of the present invention to provide a method and apparatus by which oil on the surface of a body of water can be efficiently collected and, if desired, in such concentrations to render it suitable for salvage.

SUMMARY OF THE INVENTION

In accordance with the principles of the present invention an oil skimming barge includes a transition compartment arranged to receive inflow from the surface of a body of water over the rim of a pivoted floating baffle. Surface liquid inflow to the compartment is determined by the position of the baffle which in turn is determined by the outflow of water from the bottom of the downstream end of the compartment. Upon reaching the rear wall of the compartment the surface oil begins building up in depth. If a plurality of transition compartments having floating baffle inlets are arranged to serially receive surface liquid inflow from previous compartments, the concentration of oil in succeeding compartments increases significantly. Proximate the downstream end of the last transition compartment there is disposed an oil recovery compartment also having a floating baffle inlet arrangement and from which recovered oil is withdrawn at a suitable rate to control the inlet baffle position. Preferably the inlet to the recovery compartment faces a downstream direction to render inflow to the recovery compartment substantially independent of perturbations in the liquid resulting from the overall surface flow.

With the above described arrangement the depth of the oil becomes increasingly greater in each compartment and thereby produces inflow of substantially water free oil into the recovery compartment at the downstream end of the last transition compartment.

It is therefore an object of the present invention to provide a method and apparatus for separating surface oil from a body of water by creating a surface flow by which the depth of the oil is increased at the downstream end of the flow path.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a top view in plan of an oil skimming barge according to the principles of the present invention;

FIG. 2 is a side view in plan of the oil skimming barge of FIG. 1;

FIG. 3 is a diagrammatic representation of the oil skimming barge of FIG. 1 illustrating operation under static conditions wherein water is not evacuated from the various chambers;

FIG. 4 is a diagrammatic representation of the oil skimming barge of FIG. 1 illustrating the barge in operation;

FIG. 5 is a view in perspective of one of a pair of wing baffles employed at the prow of the barge of FIG. 1 to facilitate collection of surface liquid at the inlet of the first separation compartment.

DESCRIPTION OF THE PREFERRED EMBODIMENT

Referring specifically to FIGS. 1 and 2 of the accompanying drawings there is illustrated an oil-skimming barge 10 comprising a pair of transversely-spaced floats 11, 13 secured to and supporting a deck 15. A skimming pan 17 depends from deck 15 and includes an upstream end 19 which extends forwardly of floats 11, 13 and deck 15. Skimming pan 17 is defined at its bottom by wall 16, at its downstream end by vertical wall 21, and along its sides by vertical side walls 23, 25. The top of the skimming pan may be open.

Upstream end 19 of the skimming pan is substantially wider than the spacing between floats 11, 13 and is defined along its entire width by three floating baffles 27, 29, 31 arranged edge to edge. The baffles are generally configured in the form of panels pivotally mounted along their bottom edges on and extending upwardly from bottom wall 16. Baffles 27, 29, 31 are arranged to pivot inwardly, but not outwardly, of skimming pan 17 to a degree dependent upon the pressure differential appearing across the baffles.

Side walls 23, 25 converge in a downstream direction from baffles 27, 29, 31 to a location at which their spacing is less than that between the floats, beyond which location the side walls extend parallel to one another and terminate at downstream wall 21. Bottom wall 16 slopes downwardly in a downstream direction from the baffles until reaching the location at which the side wall convergence terminates; at this location bottom wall 16 becomes horizontal and so extends until terminating at downstream wall 21.

The skimming pan is divided into forward and aft transition compartments 33, 35, respectively, by a partition 37 extending between side walls 23, 25 from bottom wall 16 to a height just slightly below the height of the pivot points for baffles 27, 29 and 31. A pair of further floating baffles, 39, 41, are pivotally mounted along their bottom edges atop partition 37 to swing downstream but not upstream of the partition. Baffles 39, 41 are arranged edge to edge and together extend across the entire transverse distance between the parallel sections of side walls 23, 25.

A suction header 43 extends transversely along the bottom of compartment 33 proximate partition 37. A similar suction header 45 extends transversely along the bottom of compartment 35 proximate downstream wall 21. Headers 43 and 45 communicate with respective intake ports at primary pump 47 by means of respective flexible steel pipes 49 and 51. The discharge point of pump 47 is connected to a further flexible steel pipe 53 to serve two functions to be described subsequently.

Skimming pan 17 includes three threaded supports 55 (one along each side and one at the rear) which engage respective adjustable screws 57 journaled through and extending below deck 15. By appropriate adjustment of screws 57 the depth of the skimming pan in a body of water 20 can be selected. A recovery compartment 59 is adjustably supported by similar manner by means of three threaded supports 61 and adjustable screws 63. The recovery compartment is disposed within transition compartment 35 but is in no way directly secured to skimming pan 17 so that the depth of the recovery compartment 59 within compartment 35 is completely adjustable by means of screws 61. Recovery compartment 59 includes an inlet defined by floating baffle 65 pivotable along its bottom edge inwardly of recovery compartment to a degree determined by the pressure differential appearing across the baffle. A flexible steel pipe 67 communicates between bottom of compartment 59 and the inlet port of an oil pump 69. The discharge port of pump 69 is connected by tube 70 to an oil storage tank 71. Apart from baffle 65 the sides of recovery compartment 59 are totally sealed.

A pair of rigid wing baffles 73, 75, extend from opposite forward corners of upstream end 19 of the skimming pan. Baffles 73, 75 are in the form of rigid panel members hinged to the skimming pan at one end and secured to deck 15 at their other end by adjustable lengths of rope or wire 77, 79. These wing baffles are arranged to be partially immersed in a body of water 20 and are directed at angles suitable for guiding surface liquid into skimming pan 17. To aid such guiding, the baffles (see FIG. 5) are provided with a plurality of spaced nozzles 81 along their top edges which are above the surface of a body of water 20 and with a plurality of spaced nozzles 83 extending along their bottom edges which are below the surface of body 20. Nozzles 81 are directed horizontally and generally toward upstream end 19 of the skimming pan. Nozzles 83 are also directed generally toward the upstream end 19 of the skimming pan but are angled upwardly toward the surface of body 20. Nozzles 81, 83 may be supplied pressurized water from a separate pump but are preferably supplied by primary pump 47 via discharge tubing 53. The combination of the gathering effects of the wing baffles 73, 75 when barge 10 moves forward, and the flowing effects of the jets issuing from nozzles 81, 83 cause surface liquid in body 20 to flow toward the upstream end of skimming pan 17.

In operation, it is to be remembered that skimming pan 17 is totally sealed along its bottom and all of its sides except for upstream end 19. Inflow of surface liquid via the upstream end is dependent upon the position of floating baffles 27, 29, 31. If the level of skimming pan 17 is lowered sufficiently, flow of surface liquid from body 20 into transition compartment 33 occurs over the baffles. Under static conditions, defined as the conditions wherein no suction is applied to suction headers 43, 45 and 67, and as diagrammatically illustrated in FIG. 3, baffles 27, 29, 31 float with their top edges well above the water level. Likewise the top edges of baffles 39, 41 extend above the water level. There is no flow into transition compartments 33 and 35 under these conditions.

If suction is applied to suction headers 43 and 45, water at the bottom of the downstream end of compartments 33 and 35 is removed from these compartments thereby lowering the position of baffles 27, 29, 31 and 39, 41. If baffles 27, 29, 31 are lowered sufficiently, flow from the surface of liquid body 20 flows over the upper edges of the baffles into transition compartment 33. This flow includes both water and surface oil. A current is established in compartment 33 whereby the relatively dense water flows out of the compartment primarily via suction header 43 whereas the lighter oil remains at the surface and begins to build up in depth toward the downstream end of compartment 33. This build up in depth of the surface oil is important, for if the outflow of water via suction header 45 from compartment 35 is sufficient, baffles 39, 41 are also lowered sufficiently to permit surface flow from compartment 33 into compartment 35. Since the depth of oil at the downstream end of compartment 33 is greater than the depth of oil at the surface of liquid body 20, the oil to water ratio of the liquid entering compartment 35 is substantially higher than the oil to water ratio of the liquid entering compartment 33. Applied suction at header 45 produces a current in compartment 35 similar to that in compartment 33 whereby water is drawn from the compartment via the suction header and the surface of oil begins building up to an appreciable depth at downstream wall 21. The depth of oil at that location is significant, on the order of inches, as opposed to the nominally ¼inch depth of the surface oil in body of liquid 20. Thus the oil can be gathered much more readily at the downstream end of the skimming pan than from surface of liquid body 20 or even at the downstream end of compartment 33.

If recovery compartment 59 is lowered sufficiently into compartment 35 the oil collected at the downstream end of the skimming pan flows into the recovery compartment over the top edge of baffle 65. Thereafter the position of baffle 65 is controlled by the depth of oil in the recovery compartment which in turn is controlled by the rate of outflow of oil produced by suction applied to tube 67.

The use of two or more compartments 33, 35 has been found to provide much greater separation than the use of one such compartment having a floating baffle at its inlet. More specifically, in one embodiment of the illustrated barge employing two transition compartments, compartment 33 was found to contain approximately 5 percent oil and 95 percent water whereas compartment 35 was found to contain approximately 50 percent oil and 50 percent water. The liquid in recovery compartment 59 was found to comprise virtually 100 percent oil in the absence of emulsification. Importantly, to achieve these impressive results no centrifugal separators or other complex machinery need be employed; rather the liquid in recovery chamber 59 is merely pumped into storage tank 71 and disposed of as desired.

The series of transition compartments 33, 35 employing floating baffle inlets also permits quieting of wave action at the point of recovery, namely at recovery compartment 59, whereas when only a single transition compartment is used wave action was found to significantly increase the water content in the recovery compartment.

Water discharge from main pump 47 may also be employed for propulsion purposes for barge 10 during a skimming operation. This combined with the issuance of the discharge water from nozzles 81 and 83 on the wing baffles 73 and 75 make for efficient use of the primary pump 47.

The use of three individual baffles 27, 29 and 31 in place of one integral panel extending across the entire width of upstream end 19 permits barge 10 to roll to a significant degree without affecting the depth of surface flow over the baffles. More particularly, if there were a single baffle, a rolling action of the barge would cause more surface flow over one end of the baffle than the other. Since the surface oil is at a uniform depth at both ends of the baffle, significantly more water than desired would inflow over the low baffle end. Similar rationale supports the use of two baffles 39, 41 in place of a single baffle.

There is an optimum pressure differential across the floating baffle required to create maximum flow of surface oils over the baffle edges with minimum water flow. This optimum differential varies with the viscosity of the surface oil. The optimum pressure differential for each skimming operation is determined empirically by drawing water through suction headers 43 and 45 at various rates. Obviously, the greater the withdrawal of water from compartments 33, 35, the greater is the depth of flow over the baffles. When the optimum water withdrawal rates are achieved, the surface oils gradually increase in depth, as described above, sufficiently to be removed by recovery compartment 59. Importantly, this removal is effected by simply flowing the oil over a baffle 65 and not by centrifugal separation.

While floating baffle inlets per se are known, the utilization of a series of compartments having such inlets to create a surface flow to produce a gathering of surface oil to a significant depth, and thereby permit separation, is quite novel and affords a relatively simple and inexpensive approach to removing surface oils. Of course while the present invention has been described in terms of skimming oil from the surface of a body of water, the principles described herein are applicable to skimming of any liquid of relatively low density from the surface of a body of a further liquid of a relatively higher density.

Since the barge itself is floating and the flow restricting baffles are floating, positive control over the depth of flow over the baffles can be readily maintained. This depth of flow is quite important. If the depth is insufficient surface oil cannot flow over the baffles. If the depth is too great water tends to flow under the surface oil without substantially moving the surface oil; the oil therefore does not flow in a surface current toward the rear of the skimming pan and therefore does not gather to a significant depth suitable for collection in recovery compartment 59. As described above the optimum depth of flow over the baffles is readily found empirically by varying the rate of water withdrawal from the compartments. This rate is varied by valves suitably placed in the suction lines 49 and 51. In addition the depth of the skimming pan in the body of liquid 20, and hence the depth of the floating baffles 27, 29, 31, 39, 41, is adjustable by means of adjusting screws 57 to provide an initial course adjustment which is refined by the rate of outflow through the suction headers. Likewise, recovery compartment 59 is adjustable in depth relative to the surface of liquid in compartment 35 by means of adjusting screws 63 to provide a course adjustment of the position of baffle 65. Withdrawal of oil from compartment 59 via tubing 67 provides a fine and continuous adjustment of the position of baffle 65.

As noted above tubing 49 and 51 is made flexible to permit free variation of the elevation of the skimming pan 17 and oil recovery compartment 59 without damage to the tubing.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A skimmer barge for skimming a first liquid of relatively low density, such as oil, from a surface of a body of a second liquid of relatively high density, such as water, on which said skimmer barge is floating, said skimmer barge including:

a. At least one horizontally elongated transition compartment having three walls and a floor, the upstream end thereof being disposed proximate the prow of the barge, a downstream end, and a floating baffle comprising at least one panel-like member disposed at the upstream end of the transition compartment and pivotally mounted along the bottom edge of the member to swing inwardly of the transition compartment to a degree determined by the pressure differential across the member when the bottom of the transition compartment is below the surface of the second liquid, b. means for controllably withdrawing said second liquid from a location proximate the bottom of the downstream end of the transition compartment, c. a recovery compartment having three walls and a floor and which is suspended in said transition compartment proximate the downstream end thereof, and attached independently to the barge, an inlet in one wall of the recovery compartment from the transition compartment, said inlet being defined by a floating baffle pivotable along its lower edge to a degree determinable by the pressure differential appearing across the baffle when liquid flows into the recovery compartment from the transition compartment, and an outlet from the bottom of the recovery compartment, d. means for controllably withdrawing first liquid from the recovery compartment outlet, e. means for selectively adjusting the depth of the transition compartment in the body of second liquid on which the barge is floating, and f. means for selectively adjusting the depth of the recovery compartment in liquid which enters the transition compartment.

2. The combination as in claim 1 wherein the inlet to the recovery compartment faces the downstream end of the transition compartment.

3. The combination as in claim 1 wherein the means for controllably withdrawing first liquid from the recovery compartment comprises a pump, a flexible conduit which connects the outlet of the recovery compartment with the inlet of the pump, a storage tank on the barge for first liquid, and a conduit which connects the storage tank with the outlet of the pump.

4. The barge according to claim 1 further comprising a partition member for sub-dividing said one transition compartment into first and second transition compartments, said first transition compartment including said floating baffle at its upstream end, said second transition compartment including a further floating baffle supported along its bottom edge atop said partition member to pivot inwardly of said second compartment and control liquid flow from said first to said second transition compartments, said recovery compartment and said means for withdrawing said second liquid being disposed in said second transition compartment, said first transition compartment also including means for controllably withdrawing second liquid from a location proximate the bottom of its downstream end.

5. The combination according to claim 1 further comprising: a pair of wing-like panels extending forwardly of said barge in mutually skewed relation from respective corners of the prow of said barge and partially submerged in said body of second liquid; and means for issuing second liquid pumped from said transition compartments into said body of liquid from said wing-like panels and generally toward upstream end of said first transition compartment.

6. The combination according to claim 5 wherein said means for issuing includes: a first plurality of nozzles arranged along a submerged edge of each wing-like panel and directed generally toward the surface of said body; a second plurality of nozzles arranged along an emerged edge of each wing-like panel and directed generally parallel to the surface of said body; and liquid conduit means interconnecting said means for pumping and said nozzles.

* * * * *